US009300605B2

(12) United States Patent
Brillhart et al.

(10) Patent No.: US 9,300,605 B2
(45) Date of Patent: Mar. 29, 2016

(54) SYSTEM AND METHOD TO PROVIDE A CENTRALIZED ALERTING AND AWARENESS SYSTEM THROUGH THE USE OF AN EAR PIECE OR OTHER USER INTERFACE

(71) Applicant: International Business Machines Corporation, Armonk, NY (US)

(72) Inventors: David C. Brillhart, Orlando, FL (US);
Christopher J. Dawson, Arlington, VA (US); Rick A. Hamilton, II, Charlottesville, VA (US); Michael D. Kendzierski, New York, NY (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 196 days.

(21) Appl. No.: 13/863,050

(22) Filed: Apr. 15, 2013

(65) Prior Publication Data
US 2013/0318179 A1 Nov. 28, 2013

Related U.S. Application Data

(63) Continuation of application No. 11/851,060, filed on Sep. 6, 2007, now abandoned.

(51) Int. Cl.
*H04L 12/58* (2006.01)
*G06F 17/30* (2006.01)

(52) U.S. Cl.
CPC .......... *H04L 51/00* (2013.01); *G06F 17/30867* (2013.01)

(58) Field of Classification Search
CPC ......... H04L 51/00–51/38; H04L 67/22–67/24; H04L 67/325; G06F 9/546; G06F 17/30867; G06Q 10/063114–10/063116; G06Q 10/109–10/1097
USPC ........ 705/7.15, 7.19–7.21; 709/203, 206–207
See application file for complete search history.

(56) References Cited

U.S. PATENT DOCUMENTS

| | | | |
|---|---|---|---|
| 6,091,956 A | 7/2000 | Hollenburg | |
| 6,281,811 B1 | 8/2001 | Ranzino | |
| 6,741,188 B1 | 5/2004 | Miller et al. | |
| 6,925,603 B1 | 8/2005 | Naito et al. | |
| 7,031,475 B2 | 4/2006 | Kuraoka et al. | |
| 7,068,189 B2 | 6/2006 | Brescia | |
| 7,095,981 B1 | 8/2006 | Voroba et al. | |
| 7,120,388 B2 | 10/2006 | Hall | |
| 2002/0087649 A1* | 7/2002 | Horvitz | 709/207 |
| 2002/0087757 A1 | 7/2002 | Wagner | |
| 2002/0133449 A1* | 9/2002 | Segal | G06Q 40/04 705/37 |
| 2003/0046421 A1 | 3/2003 | Horvitz et al. | |
| 2005/0089186 A1 | 4/2005 | Kulas | |

(Continued)

*Primary Examiner* — Linglan Edwards
*Assistant Examiner* — Kevin Bechtel
(74) *Attorney, Agent, or Firm* — Schmeiser, Olsen & Watts, LLP; Matthew Chung

(57) ABSTRACT

The personal information manager system comprises a centralized information manager (CIM) and a personal information manager (PIM) device. The centralized information manager is encoded on a server and is accessable by the PIM device through Internet protocols over a wireless medium. The PIM, to be carried by a user, is connected to the CIM by a wireless transmitter, receives context-sensitive, customized, prioritized, filtered, and aggregated information from the CIM, and can directly receive GPS data and other sources of local information.

3 Claims, 6 Drawing Sheets

(56) References Cited

U.S. PATENT DOCUMENTS

| | | |
|---|---|---|
| 2006/0078122 A1 | 4/2006 | Dacosta |
| 2006/0223594 A1* | 10/2006 | Chen ............... H04M 1/0258 455/575.2 |
| 2006/0262945 A1 | 11/2006 | Lechner |
| 2007/0043687 A1* | 2/2007 | Bodart et al. ............ 707/1 |
| 2007/0204323 A1* | 8/2007 | Wilkinson ......... G06F 21/57 726/1 |
| 2008/0004907 A1 | 1/2008 | Bayne |
| 2009/0070424 A1 | 3/2009 | Brillhart et al. |

* cited by examiner

SYSTEM AND METHOD TO PROVIDE A CENTRALIZED ALERTING AND AWARENESS SYSTEM THROUGH THE USE OF AN EAR PIECE OR OTHER USER INTERFACE

CROSS REFERENCE TO RELATED APPLICATION

This is a Continuation application of U.S. patent application Ser. No. 11/851,060 filed on Sep. 06, 2007, and now abandoned.

FIELD OF THE INVENTION

The present invention relates generally to methods for receiving information from multiple input streams and resending the information subject to a personalized priority based on characterization of information received.

BACKGROUND OF THE INVENTION

Today's communication systems make vast amounts of information potentially available to individuals, but each information source associates with a particular type of device for receiving the information. While some devices will access multiple information streams such as Internet, phone, and email, no one device can access all of the disparate sources available. Even if such a device were available, a problem would arise in managing the volume of information that could potentially be received. For example, a person may receive cell phone messages from home, and email messages from work on a blackberry. In addition, Global Positioning System (GPS) information, traffic alerts, weather alerts, and stock alerts may also be received. Sensor information such as biometric monitoring, temperature information, outside wind level information, and security monitoring may also be accessed. Such information is transmitted on different media and received on different receiving devices.

Therefore, a problem arises in management of multiple information streams. First, it would be desirable to receive information regarding all of the multiple streams through one device. Second, given the volume of messages coming to a user from a disparity of sources through such a single device, it would be desirable for a user to receive the information in a managed and non-disruptive way. Therefore, a need exists for a centralized information manager device to enable an individual to receive information regarding multiple streams through a single device. Further, a need arises for a system to control the flow of information to such a device in order to manage user disruption.

SUMMARY OF THE INVENTION

The personal information manager system comprises a centralized information manager (CIM) and a personal information manager device (PIM). The CIM is encoded on a server that is accessible from the PIM thru a wireless medium. The CIM aggregates source data by way of Internet-based information alerts. The Internet-based information alerts are generated from a variety of sources. These sources include subscription services or other freely available data banks, software agents that proactively troll the Internet for relevant insights, and messages sent from the PIM (for example, a GPS locator to inform the CIM of the user's locale (the PIM location)). The personal information manager device, to be carried by a user, communicates with the CIM by way of wireless protocols. A key aspect of the PIM is the ability of the PIM to automatically detect the current location of the user, which is best accomplished through the receipt of GPS data from the satellite. The CIM comprises a medium interface library, a rule formation program, a buffer program, and a transmission program. The personal information manager device comprises a processor, a power supply, a memory, a GPS receiver, a cellular transceiver, a user interface device, and a display. The personal information manager device may also have an in-ear device to alert the user to received data. The medium interface library contains an application interface for each medium in the system. Each application interface receives and formats information from the incoming data and sends the formatted information to the buffer program. The data is formatted in accordance with four characteristics: medium, originator, content, and external factors. The buffer program uses the formatted data to access a rule from the rules file and to apply the rule to determine a transmission time for the data and place the data in a queue within the buffer. The transmission program continuously checks the queue for transmission times that need to be increased or decreased based upon external sensor data or other factors and transmits the data when the transmission time for the data is reached. The queue in the buffer may be reordered based on a dynamic priority weighting of the information.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
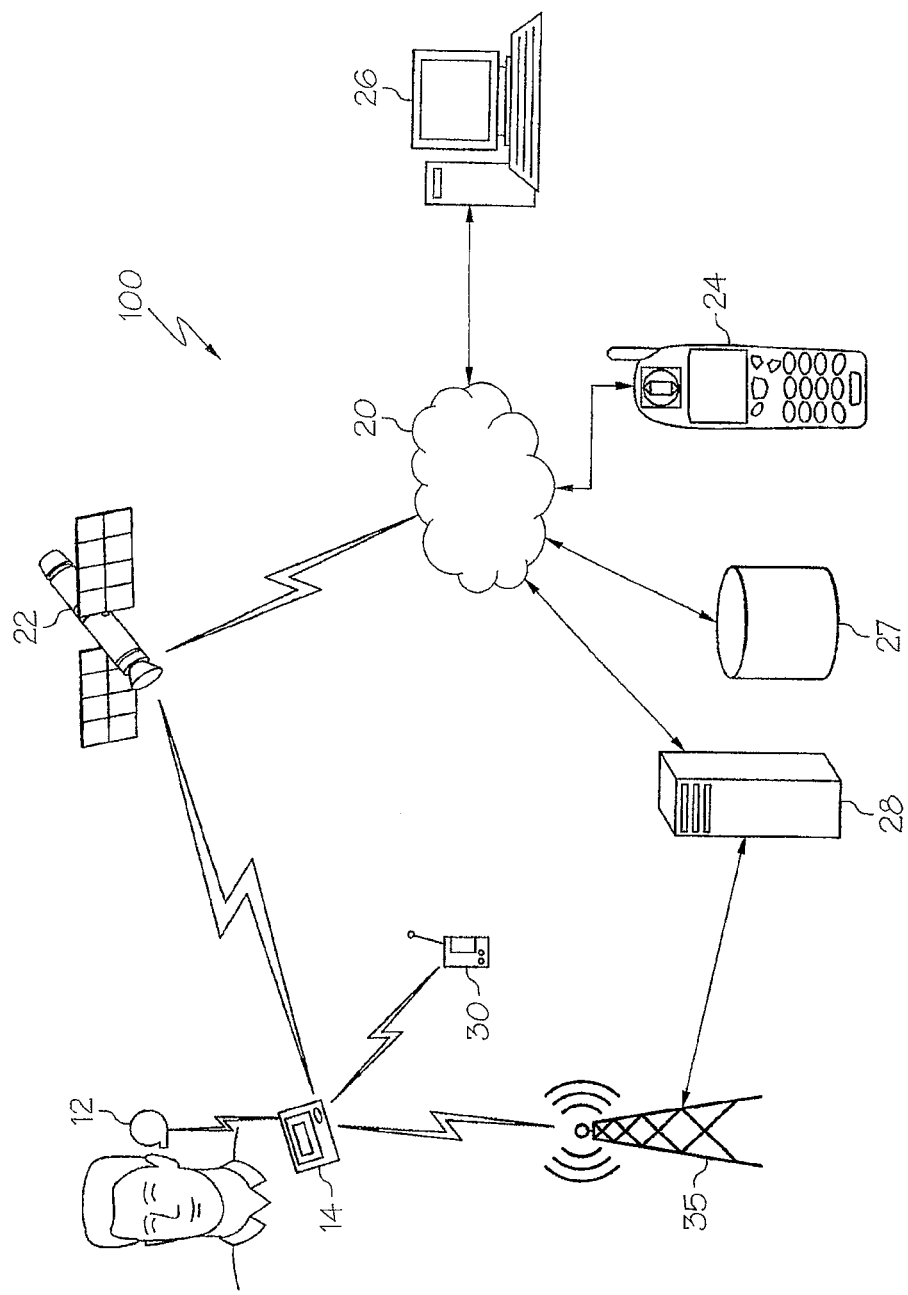
FIG. 1 is an illustration of the personal information manager system.

FIG. 1 is an illustration of centralized information manager system 100. As used herein, the term "centralized information manager system" shall mean a centralized information manager connected to a personal information manager device and adapted to receive data from multiple media streams and from external sensors. Centralized information manager system 100 comprises personal information manager device 14, in-ear device 12, server 28, database 27, Internet 20, and wireless transmitter 35. Centralized information manager system 100 receives data from external factor sensor 30, computer 26, cell phone 24, and satellite 22. Computer 26, cell phone 24, and satellite 22 are merely representative of the type of information media by which information can be received. Persons skilled in the art will be aware of numerous information media streams that can be connected to server 28 by Internet 20. As used herein, the term "external factor sensor" shall mean a sensor device adapted for communication with the centralized information manager and/or the personal information manager device. External factor sensor 30 is representative of a sensor incorporated into centralized information manager system 100. Persons skilled in the art are aware of many different sensors that can be incorporated to provide data to centralized information manager system 100.

Figure 2:
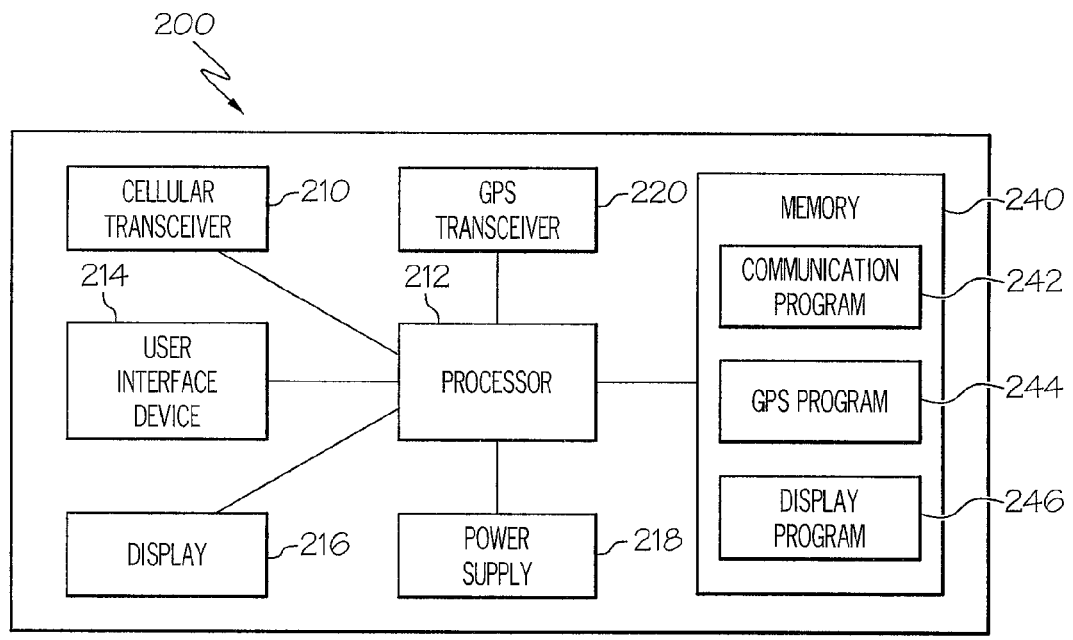
FIG. 2 is an illustration of the configuration of the personal information manager device.

FIG. 2 depicts personal information manger device internal configuration 200 illustrating one embodiment of an internal configuration for personal information manager device 14. As used herein, the term "personal information manager device" shall mean a programmable device to be worn by a user and adapted to receive data from a centralized information manager system. Personal information manager device internal configuration 200 comprises processor 212 electrically connected to power supply 218, memory 240, GPS receiver 220, cellular transceiver 210, user interface device 214 and display 216.

Figure 3:
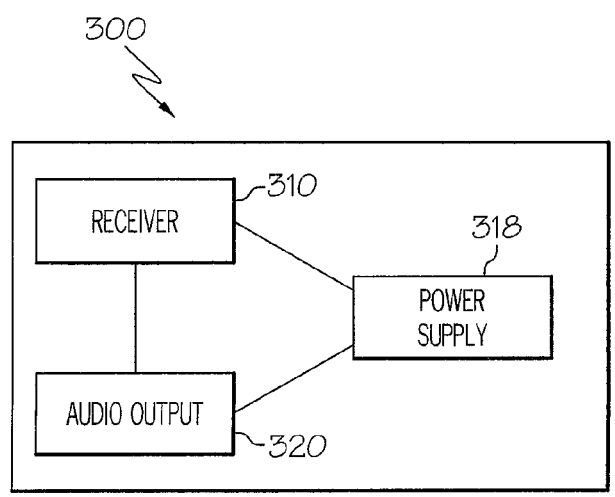
FIG. 3 is an illustration of the configuration of the personal information manager in-ear device.

FIG. 3 depicts in-ear device internal configuration 300 illustrating one embodiment of an internal configuration for in-ear device 12. In-ear device internal configuration 300 comprises receiver 310 electrically connected to power supply 318 and audio output 320. Receiver 310 is adapted to communicate with user interface 214 of personal information manger device internal configuration 200.

Figure 4:
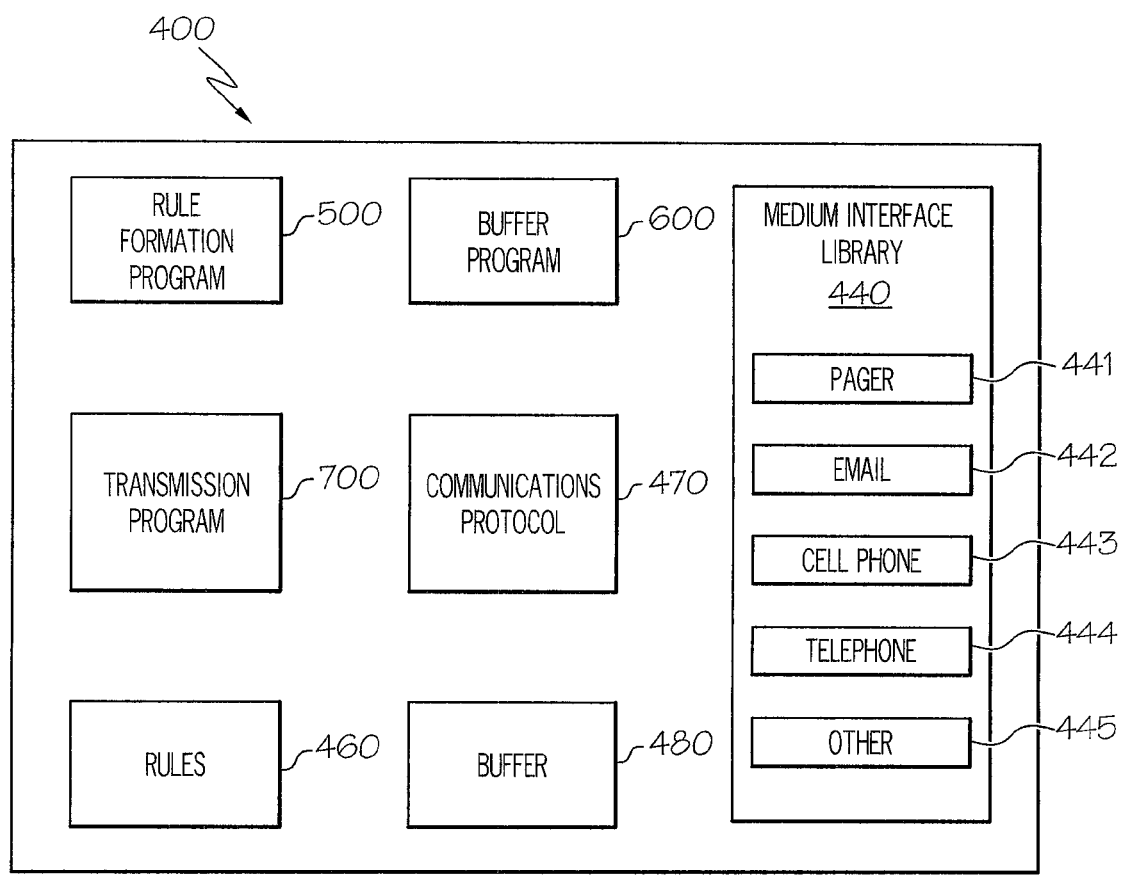
FIG. 4 is an illustration of the files and programs encoded in the server memory.

FIG. 4 depicts centralized information manager 400 encoded on a computer readable medium of server 28 (see FIG. 1). As used herein, the term "centralized information manager" shall mean one or more programs encoded in a server memory adapted to format and send data regarding multiple media streams to a personal information manager device based upon user configured priorities. Centralized information manager 400 comprises medium interface library 440, rule formation program 500, buffer program 600, and transmission program 700. Centralized information manager 400 also contains communications protocol 470, rules file 460, and buffer 480. Medium interface library 440 contains pager application interface 441, email application interface 442, cell phone application interface 443, telephone application interface 444, and other application interface 445. Other application interface 445 is representative of any other application interface known to a person skilled in the art. Communications protocol 470 enables centralized information manager 400 to receive unformatted data from multiple media and to send formatted data to personal information manager device 14.

Figure 5:
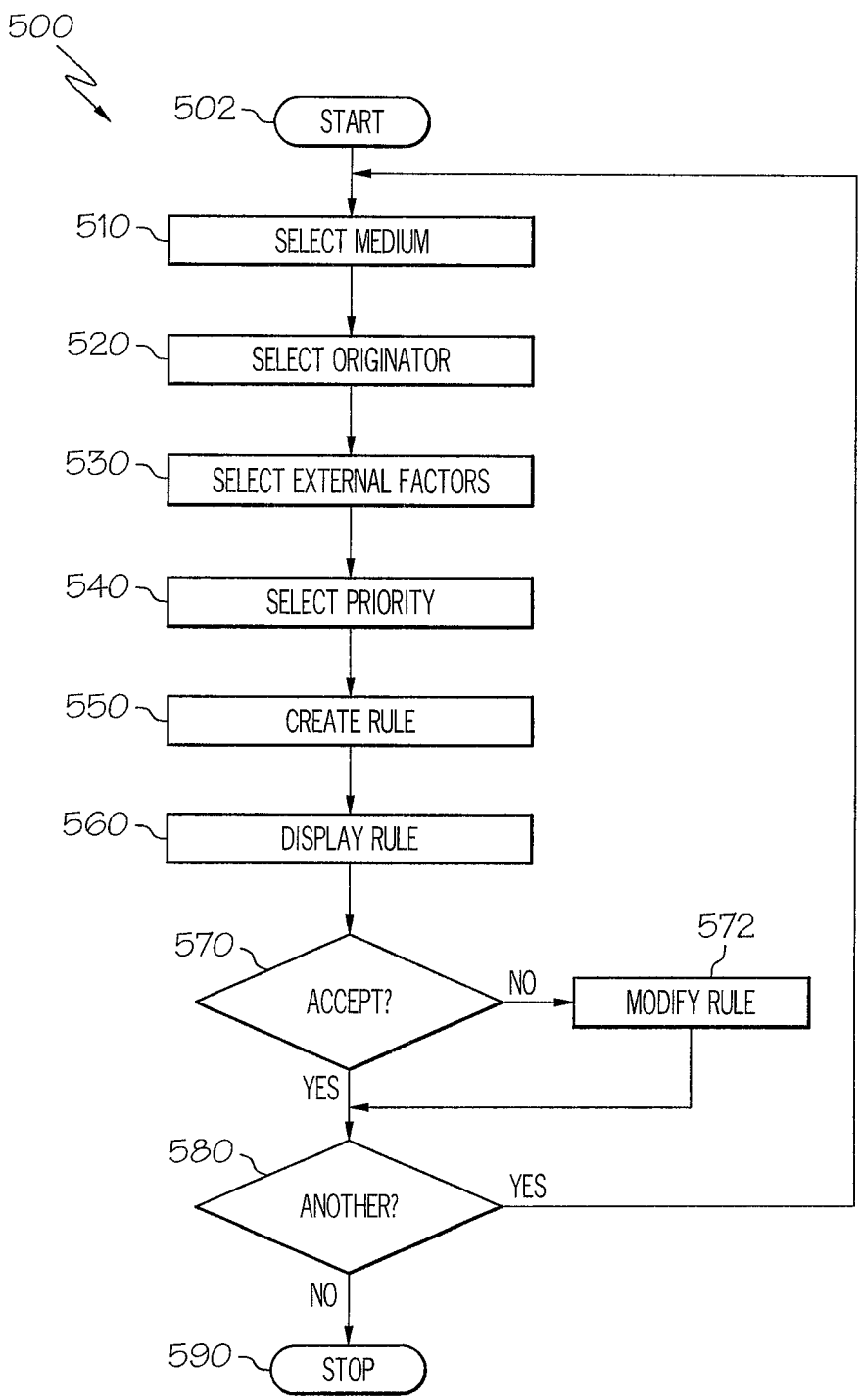
FIG. 5 is an illustration of the logic of the rule formation program.

FIG. 5 depicts the logic of rule formation program 500. Rule formation program 500 starts (502) when a user accesses centralized information manager in order to establish personalized priorities. The user selects a medium (510). As used herein, the term "medium" shall mean a designation of the type of transmission medium. The user does not need to select "content" because when a medium is selected, the appropriate interface application will be associated with the selection. In accordance with communication protocol 470 (See FIG. 4), the interface application will receive data from the medium and send the formatted data to the personal information device. Formatting will be provided by the appropriate application interface, and will include the content. As used herein, the term "content" shall mean a description of the type of information contained in the medium The user then selects an originator (520). As used herein, the term "originator" shall mean the person, service, or device sending data to the user. The user selects external factors (530). As used herein, the term "external factors" shall mean a designation of a condition independent of the type of data transmitted, the originator, or the content. For example, an external factor may be the time of day, the user's location, the weather, or a user's computerized calendar entry. The user selects a priority (540) based upon the medium, the originator, the content, and the external factors. Rule formation program 500 creates a rule based upon the user's selections and priority (550) and displays the rule (560). As used herein, the term "rule" shall mean an encoded instruction applied to data received and analyzed by the centralized information manager in order to assign a transmission time determinative of a queue order in a buffer. The user reviews the rule and rule formation program 500 prompts the user to decide whether to accept or reject the rule (570). If the user rejects the rule, the user modifies the rule (572) and rule formation program 500 goes back to step 560, displays the rule (560) and prompts the user to decide whether to accept or reject the rule (570). If the user accepts the rule at step 570, rule formation program 500 goes to step 580. The process continues until the user receives a satisfactory rule. At step 580, rule formation program determines whether another rule is to be made. If so, rule formation program goes to step 510 and repeats the entire process. If not, rule formation program 500 ends (590).

Figure 6:
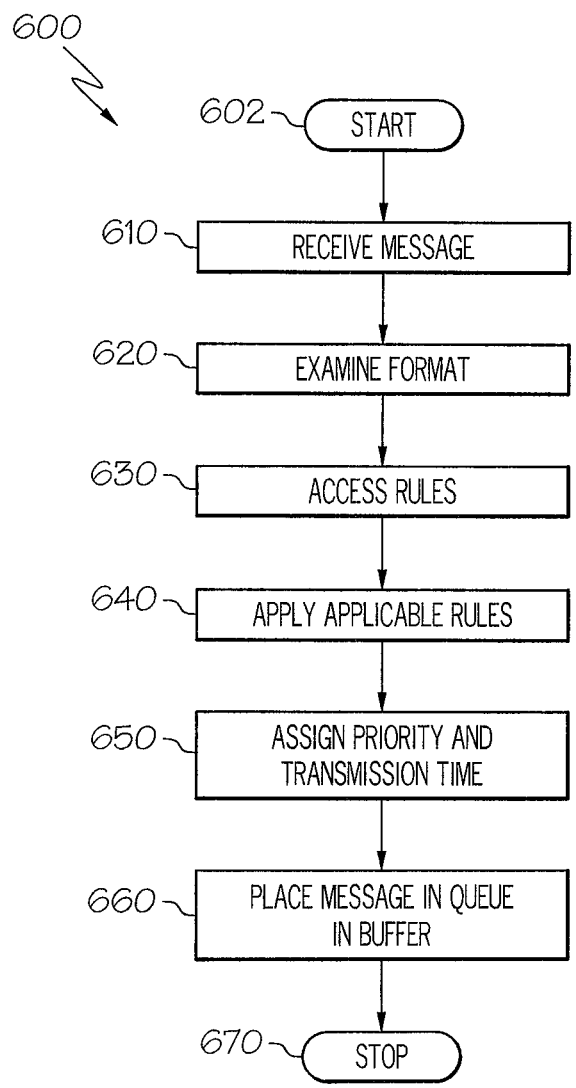
FIG. 6 is an illustration of the logic of the buffer program.

FIG. 6 depicts the logic of buffer program 600. Buffer program 600 starts (602) when a message is received by centralized information manager 400 (610). Buffer program examines the format of the data (620) and accesses rules file 460 (see FIG. 4) to locate a rule (630) to apply to the format (620). The format of the data has been created by the appropriate application interface from medium interface library 440 (see FIG. 4). The applicable rule is applied to the message (640), and a priority and transmission time are assigned by buffer program 600 to the data (650). The message is placed in queue in the buffer (660) and buffer program 600 stops (670). Examples of formatted data are as follows:

| Medium | Originator | Content | External Factors | Priority | Queue Position |
| --- | --- | --- | --- | --- | --- |
| Pager | Spouse | Call Home | 5:00 p.m. | High | 2 |
| Heart Monitor | Heart | High Heart Rate | Location: insite | High | 1 |
| Email | Traffic Service | Traffic Alert | Location: on road | High | 3 |
| Email | Weather Service | Severe Weather tomorrow | Location: on road | Medium | 4 |
| Email | Stock Service | XYZ Corporation Stock move | 5:00 p.m Stock Exchange closed | Medium | 5 |

Persons skilled in the art are aware of multiple additional examples of types of data that can be formatted according to the characteristics of medium, originator, content, and external factors.

Figure 7:
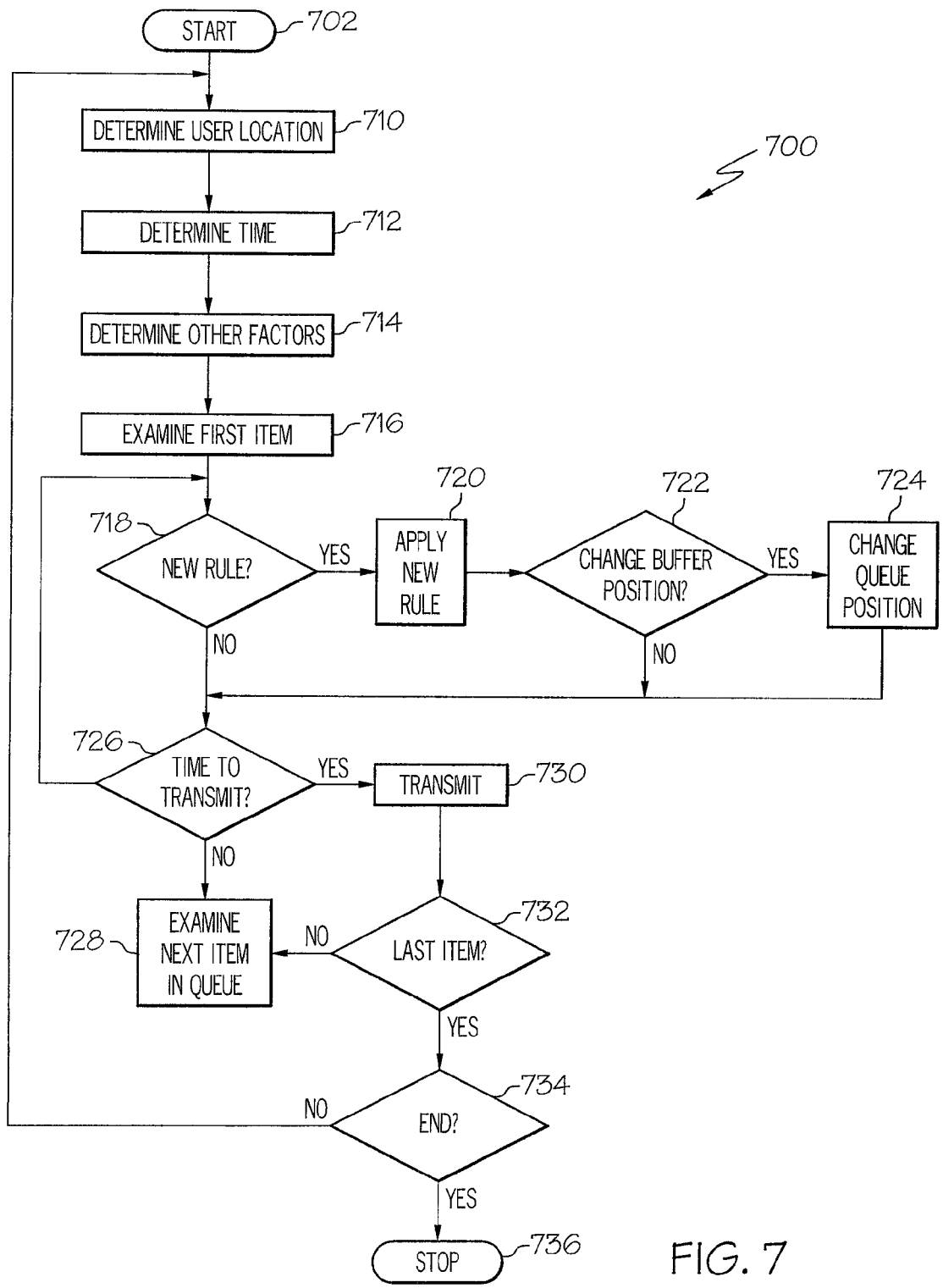
FIG. 7 is an illustration of the logic of the transmission program.

FIG. 7 depicts the logic of transmission program 700. Transmission program 700 starts (702) when centralized information manager 400 is activated. Transmission program 700 determines a user location using GPS coordinates from personal information manager device 14 (710). Transmission program 700 determines the time (712) and also determines any other factor which may be applied (714). Transmission program 700 examines the first item in queue (716), and determines whether a new rule needs to be applied based upon the user location, the time, or another external factor (718). If a new rule is to be applied, then transmission program applies the rule (720) and determines whether a change in buffer position is required (722). If a change in buffer position is required, transmission program 700 assigns a new priority and transmission time (724). In this manner, transmission program 700 increases or decreases the rate at which information is sent to a user. If at step 722 no change in buffer position was indicated, or after changing the buffer queue position, transmission program 700 goes to step 730. Next, transmission program 700 determines whether it is time to transmit the data (726), and if so, transmits the data (730) or goes to step 728 and examines the next item in queue (728). If it is not time to transmit the data, transmission program 700 examines the next item in queue (728). After transmitting the data, transmission program 700 determines whether the item was the last item in queue (732). If not, transmission program 700 goes to step 728 to examine the next item in queue. When transmission program 700 reaches the last item in queue, a determination is made whether to end the program or continue (734). If the determination is to continue, transmission program 700 returns to step 710 and begins the cycle over again. If the determination is to end the program, transmission program 700 stops (736).

With respect to the above description, it is to be realized that the optimum dimensional relationships for the parts of the invention, to include variations in size, materials, shape, form, function, manner of operation, assembly, and use, are deemed readily apparent and obvious to one of ordinary skill in the art. The present invention encompasses all equivalent relationships to those illustrated in the drawings and described in the specification. The novel spirit of the present invention is still embodied by reordering or deleting some of the steps contained in this disclosure. The spirit of the invention is not meant to be limited in any way except by proper construction of the following claims.

The invention claimed is:

1. A computer system for managing a message queue, the computer system comprising:
   one or more computer processors, one or more computer-readable memories, a set of external sensor devices incorporated into the computer system and configured to communicate with the one or more computer processors, one or more computer-readable storage devices, and program instructions stored on at least one of the one or more storage devices that, when executed by the one or more computer processors, cause the one or more computer processors to perform operations comprising:
   receiving, from a user, a selection of a type of transmission medium, an originator that sends data to the user, a designation of an external factor, and a priority, wherein the external factor is at least one of the time of day, the user's location, the weather, or a computerized calendar entry of the user;
   creating and displaying a rule based upon the received user selections;
   prompting the user to accept or reject the displayed rule;
   receiving a message;
   determining an applicable rule to apply to the message and assigning a priority and transmission time to the message;
   storing the message in the message queue;
   receiving external information that comprises a present time of day, a user's geographical location, a description of weather conditions at the user's geographical location, a traffic alert, an identification of whether a stock exchange is currently open, and a computerized calendar entry;
   determining whether a new rule needs to be applied to messages in the message queue based upon the received present time of day, user's geographical location, description of weather conditions at the user's geographical location, traffic alert, identification of whether a stock exchange is currently open, and computerized calendar entry;
   assigning a new priority and transmission time to the message if a change in the message queue position is required by applying the new rule;
   processing the message in the message queue and other messages in the message queue in an order based on the relative positions of the respective messages in the message queue; and
   alerting the user to the message via an in-ear device.

2. A method for managing a message queue, the method comprising:
   receiving, from a user at a computerized system comprising one or more computer processors, one or more computer-readable memories, a set of external sensor devices configured to communicate with the one or more computer processors, and one or more computer-readable storage devices, a selection of a type of transmission medium, an originator that sends data to the user, a designation of an external factor, and a priority, wherein the external factor is at least one of the time of day, the user's location, the weather, or a computerized calendar entry of the user;
   creating and displaying, by the computerized system, a rule based upon the received user selections;
   prompting, by the computerized system, the user to accept or reject the displayed rule;
   receiving, by the computerized system, a message;
   determining, by the computerized system, an applicable rule to apply to the message and assigning a priority and transmission time to the message;
   storing, by the computerized system, the message in the message queue;
   receiving external information that comprises a present time of day, a user's geographical location, a description of weather conditions at the user's geographical location, a traffic alert, an identification of whether a stock exchange is currently open, and a computerized calendar entry;
   determining whether a new rule needs to be applied to messages in the message queue based upon the received present time of day, user's geographical location, description of weather conditions at the user's geographical location, traffic alert, identification of whether a stock exchange is currently open, and computerized calendar entry;
   assigning a new priority and transmission time to the message if a chance in the message queue position is required by applying the new rule;
   processing the message in the message queue and other messages in the message queue in an order based on the relative positions of the respective messages in the message queue; and
   alerting the user to the message via an in-ear device.

3. A computer program product, comprising a computer-readable hardware storage device having a computer-readable program code stored therein, the program code configured to be executed by a computerized system comprising one or more computer processors, one or more computer-readable memories, and a set of external sensor devices configured to communicate with the one or more processors to implement a method for managing a message queue, wherein the program code, when executed by the one or more computer processors, cause the one or more computer processors to perform operations comprising:
- receiving, from a user, a selection of a type of transmission medium, an originator that sends data to the user, a designation of an external factor, and a priority, wherein the external factor is at least one of the time of day, the user's location, the weather, or a computerized calendar entry of the user;
- creating and displaying a rule based upon the received user selections;
- prompting the user to accept or reject the displayed rule;
- receiving a message;
- determining an applicable rule to apply to the message and assigning a priority and transmission time to the message;
- storing the message in the message queue;
- receiving external information that comprises a present time of day, a user's geographical location, a description of weather conditions at the user's geographical location, a traffic alert, an identification of whether a stock exchange is currently open, and a computerized calendar entry;
- determining whether a new rule needs to be applied to messages in the message queue based upon the received present time of day, user's geographical location, description of weather conditions at the user's geographical location, traffic alert, identification of whether a stock exchange is currently open, and computerized calendar entry;
- assigning a new priority and transmission time to the message if a change in the message queue position is required by applying the new rule;
- processing the message in the message queue and other messages in the message queue in an order based on the relative positions of the respective messages in the message queue; and
- alerting the user to the message via an in-ear device.

* * * * *